US012434914B2

(12) United States Patent
Siemoni

(10) Patent No.: US 12,434,914 B2
(45) Date of Patent: Oct. 7, 2025

(54) DEVICE FOR DISPENSING FOOD SUBSTANCES

(71) Applicant: EGIS S.r.l., Porcari (IT)

(72) Inventor: Osvaldo Siemoni, Poppi (IT)

(73) Assignee: EGIS S.r.l., Porcari (IT)

( * ) Notice: Subject to any disclaimer, the term of this patent is extended or adjusted under 35 U.S.C. 154(b) by 274 days.

(21) Appl. No.: 18/027,412

(22) PCT Filed: Sep. 29, 2021

(86) PCT No.: PCT/IT2021/050300
§ 371 (c)(1),
(2) Date: Mar. 21, 2023

(87) PCT Pub. No.: WO2022/070224
PCT Pub. Date: Apr. 7, 2022

(65) Prior Publication Data

US 2024/0025655 A1 Jan. 25, 2024

(30) Foreign Application Priority Data

Oct. 1, 2020 (IT) ........................ 102020000023200

(51) Int. Cl.
*B65G 65/46* (2006.01)
*B65G 33/14* (2006.01)
*B65G 33/32* (2006.01)

(52) U.S. Cl.
CPC ............ *B65G 33/14* (2013.01); *B65G 33/32* (2013.01); *B65G 65/463* (2013.01)

(58) Field of Classification Search
CPC .. A47K 5/1202; A47K 5/1212; A47K 5/1217; B05B 9/0866; B05B 9/0861; B65G 33/14; B65G 33/32

(Continued)

(56) References Cited

U.S. PATENT DOCUMENTS 1,778,589 A * 10/1930 Eerkes .................... A47J 47/10 222/413
2,651,545 A * 9/1953 Shotton ................. B05B 9/0866 222/383.2

(Continued)

FOREIGN PATENT DOCUMENTS

CN 111513599 A 8/2020

OTHER PUBLICATIONS

International Search Report for PCT/IT2021/050300 mailed on Feb. 2, 2022.

(Continued)

*Primary Examiner* — Charles P. Cheyney
(74) *Attorney, Agent, or Firm* — Rivka Friedman

(57) ABSTRACT

Dispensing device (1) for the controlled dispensing of food substances contained in a container (2) which can be associated with the dispensing device (1) in correspondence with a mouth (20) of the container through which the substance to be dispensed passes; the device (1) comprises: a screw element (10) comprising a hollow cylindrical body (12) with an inlet (11) connectable to the container (2) and a dispensing outlet (14); a helicoid (13) disposed internally and coaxial with respect to the cylindrical body (12); a support base (3) comprising motor means (4, 5) connected and acting on the screw (10) to activate on command the controlled rotation of the helicoid (13) and obtain the consequent controlled transfer of the substance to be dispensed from the container (2) towards said dispensing outlet (14); the screw element (10) can be connected to the base (3) by means of a quick release connection.

19 Claims, 10 Drawing Sheets

(58) Field of Classification Search
USPC .................................................. 222/413, 333
See application file for complete search history.

(56) References Cited

U.S. PATENT DOCUMENTS 3,173,584 A * 3/1965 Giavasis .............. B67D 1/0425 222/404
3,723,020 A * 3/1973 Watanabe ................. F04D 7/00 415/72
4,187,959 A * 2/1980 Pelton ................... B05B 9/0866 222/383.2
4,735,345 A * 4/1988 Lee .......................... B67D 7/68 222/131
4,796,747 A 1/1989 Kajiwara
4,905,904 A * 3/1990 Ohara ....................... B67B 7/28 222/88
5,000,658 A * 3/1991 Niskanen .............. B01F 27/724 366/186
5,836,482 A * 11/1998 Ophardt ............... A47K 5/1202 222/325
6,142,750 A * 11/2000 Benecke .................. C11D 3/43 222/383.2
6,460,734 B1 * 10/2002 Schroeder ............ B67D 1/0079 222/383.2
7,198,175 B2 * 4/2007 Ophardt .............. B05B 11/0044 222/481.5
7,796,747 B1 * 9/2010 McCormack ....... H04M 3/5233 709/204
8,245,877 B2 * 8/2012 Ophardt ............... A47K 5/1217 222/63
10,702,839 B2 * 7/2020 Sollazzo Lee ........ A47J 43/044
11,638,503 B1 * 5/2023 Youdovin ............ A47K 5/1212 222/52
2003/0201285 A1 * 10/2003 Zhang ................... G01F 13/005 222/413
2004/0050875 A1 * 3/2004 Kobayashi ............ G01F 13/005 222/383.2
2005/0279783 A1 * 12/2005 Lo ......................... B05B 12/122 222/639
2007/0000941 A1 * 1/2007 Hadden ................ A47K 5/1217 222/63
2007/0194053 A1 * 8/2007 Ophardt ................. A47K 5/122 222/383.2
2009/0026225 A1 * 1/2009 Lickstein ............. A47K 5/1202 222/325
2013/0126556 A1 5/2013 Riester et al.
2016/0193618 A1 * 7/2016 Sacchet ................ A47K 5/1212 222/23

OTHER PUBLICATIONS

Italian Search Report for IT202000023200 completed on May 20, 2021.

* cited by examiner

FIG. 2
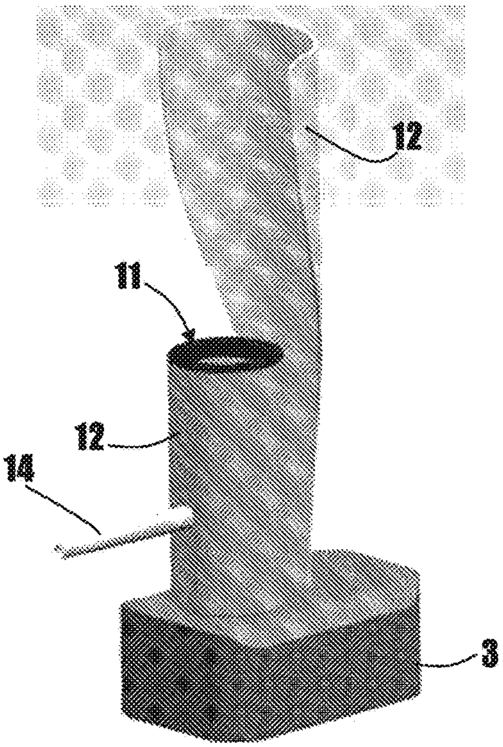
FIG. 3
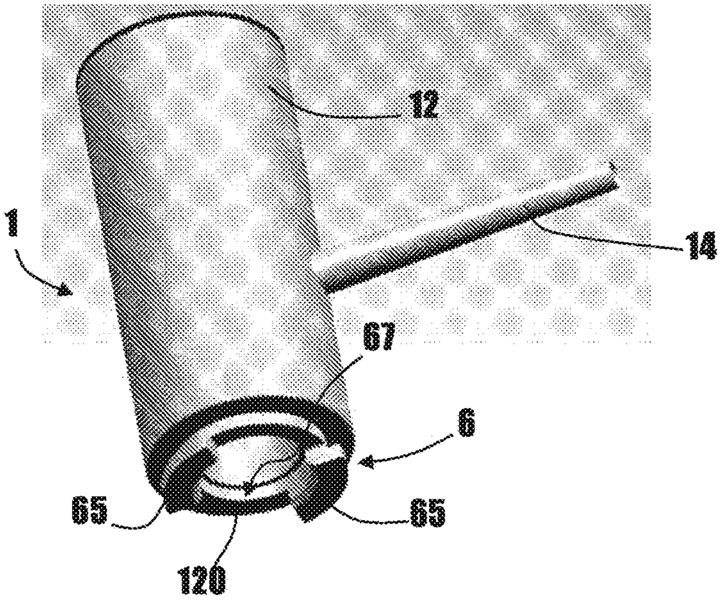
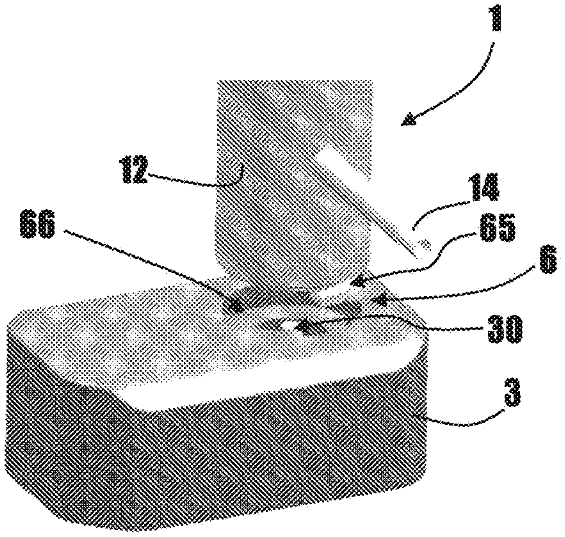
FIG. 4

DEVICE FOR DISPENSING FOOD SUBSTANCES

The present invention relates to a device for dispensing food substances in viscous, gelatinous or creamy form, such as, for example, honey, jams, marmalades, creams, sauces and preserves of various types, both sweet and salty, both anhydrous and hydrated, in which the dispensed substance may comprise a single product or mixtures of several products.

In the field of hotels, restaurants, cafeteria-bar and similar activities, dispensing devices for these substances are increasingly used, both for direct use by customers during meals, for example during breakfast, and for the use by operators, for example for filling brioches.

In their known configuration, the dispensing devices of these substances have a withdrawal section which is formed by a sort of pump, which can be operated through one or more lever mechanisms, which take a certain quantity of product from a tank or bottle and push it towards a dispensing outlet. In some cases, the thrust action provides for the sliding of pistons inside cylinders in which the food substances pass and therefore by direct contact with the latter. The dispensing outlet can be provided with a nozzle with a spout to facilitate the filling of brioches and the like.

Such known devices have numerous drawbacks better described below.

First of all, such devices generally require manual operation by an operator who exerts a force on a lever for operating the mechanism. Since these are machines that are usually also installed in accommodation facilities such as hotels, rest and refreshment areas, or in places such as bars or restaurants, the operator assigned to use this machine is often obliged to use it repeatedly, also for many times, the operating lever of the device causing in this way possible slowdowns of the working activity and, above all, the possible fatigue of the operator himself.

The pump actuation system with lever and/or piston entails further disadvantages in terms of reliability of the device, as well as the need for frequent washing of the same. In fact, the thrust action towards the dispenser often foresees the sliding of the piston and the relative seals in the chamber of the cylinder which is involved in contact with food substances; the latter release residues of various kinds that tend over time, and especially after even a short period of inactivity of the device, to adhere to the walls of the dispensing compartment, thus creating resistance, obstructions and, in extreme cases, even possible breakages of the mechanism/s due to excessive force exerted on the lever itself. The washing operations involve the disassembly and reassembly of the dispenser body; in known configurations, these operations require the disassembly and removal of several parts and components, thus determining impractical and inefficient activities for the user.

Another drawback of known devices is represented by the fact that they allow to dispense with accuracy only a predetermined quantity of product, that is the quantity corresponding to the volume that the pumping system, at each activation cycle, takes from the tank or bottle and pushes towards the outside of the dispensing device; in other words, the standard quantity that can be dispensed is discrete and is an integer multiple of the aforementioned volume. This means that in all cases in which it is desired to obtain a quantity different from the standard quantity (or from a multiple thereof) it is complicated to satisfy the requests of users interested in controlling the management costs of the offered service. This type of need occurs, for example, in all commercial activities such as bars or restaurant where the manager requires predefined quantities of honey, jams or creams with which to fill their desserts.

Another further drawback is linked to the purely "manual" use of the dispensing lever in known devices. In fact, in particular in the use by different subjects (for example in the case of different customers having breakfast in a hotel), the lever comes into physical contact with all users, with possible negative repercussions from the point of view of safeguarding hygiene rules.

A further drawback derives from the ineffectiveness of known systems to ensure, during normal operation, an almost complete dispensing of the substance contained in the tank or bottle, resulting in product waste or forcing the user to carry out manual operations to remove the contents.

U.S. Pat. No. 3,173,584, US2013/0126556 and U.S. Pat. No. 4,796,747 describe dispensers of food substances provided with motorization means for the release of the substance to be dispensed.

The main object of the present invention is to overcome the aforementioned drawbacks by proposing a dispensing device for food substances in viscous, gelatinous or creamy form having the characteristics indicated in claim 1. Other characteristics of the present invention are described in the dependent claims.

Among the advantages of the present invention the following can be mentioned: it is possible to ensure greater reliability of the dispensing system, with more flexibility in the choice of the quantity of product to be dispensed, with better accuracy and control of the dispensed quantity; with the device in question it is possible to exclude or at least strongly limit manual intervention by the user, thus increasing safety against possible contamination; the device in question can be quickly cleaned in a convenient and functional way; the product dispensed by this device does not come into contact with mechanical parts that are difficult to clean, thus guaranteeing high standards of hygiene; the possibility of disassociating the parts affected by electrical circuits from the parts affected by contact with the product further facilitates cleaning operations even with water; the device facilitates the operations of loading the containers of the product to be dispensed, allowing, in particular, to associate the product container to the dispensing device with the product outlet facing upwards, thus avoiding unwanted product losses due to the overturning of the product container and generally facilitating the container change operation; the device in question allows substantially complete emptying of the containers of the dispensed product, drastically reducing waste; the device in question also allows to dispense those types of products such as, for example, hazelnut or pistachio creams, which, due to their viscosity or density, possibly also depending on the dispensing temperature, can be difficult to dispense using the devices currently on the market; furthermore, the possibility of detaching the base of the dispensing device from the assembly comprising the part that dispenses the product and the relative container allows the aforementioned dispenser-container assembly to be stored in a refrigerated environment, particularly useful for the correct conservation of some food products; the motorization means of the device can be controlled remotely, also providing statistics relating to the consumption of the products dispensed and/or information on any faults to be repaired or maintenance to be carried out; the innovative and advantageous characteristics of the device are preserved over time, requiring extremely reduced maintenance interventions thanks to the relative constructive simplicity of the device and its ease of operation.

These and further advantages and characteristics of the present invention will be better understood by every person skilled in the art thanks to the following description and the attached drawings, provided by way of example but not to be considered in a limiting sense, in which:

FIG. 2 is a schematic perspective view of another possible embodiment of the device, in which a jacket element intended to partially cover the container for the substance to be dispensed is better visible, constituting a heating means for the same substance;

FIGS. 3, 4 and 5 show a possible embodiment of the connection between two parts of the device, shown, respectively, in a partial perspective view from below (FIG. 3), in a partial perspective view from above (FIG. 4) and in a front view with parts in section and/or removed (FIG. 5);

Figure 7:
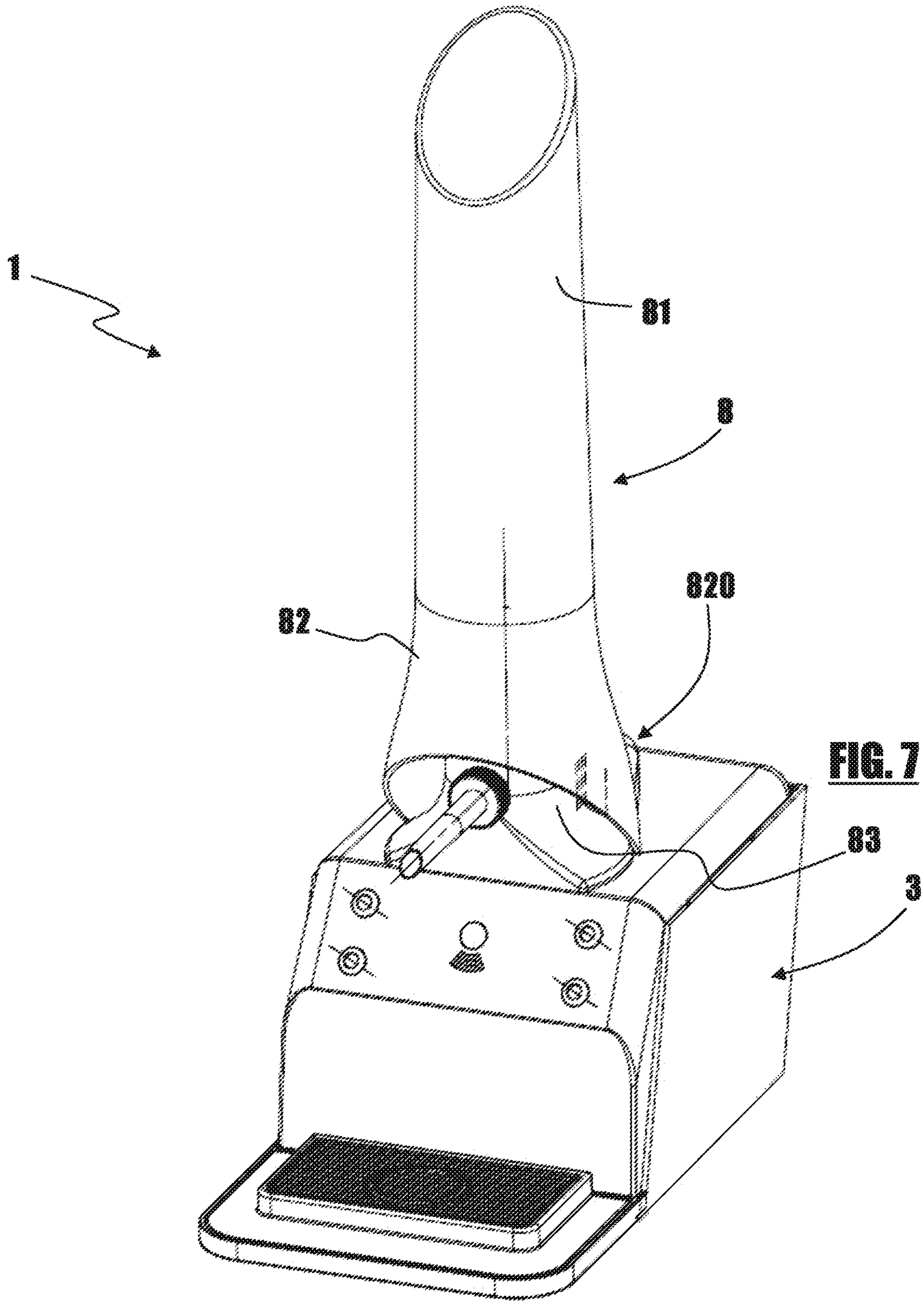
FIG. 7 is a schematic perspective view of a further possible embodiment of the device.
Figure 8:
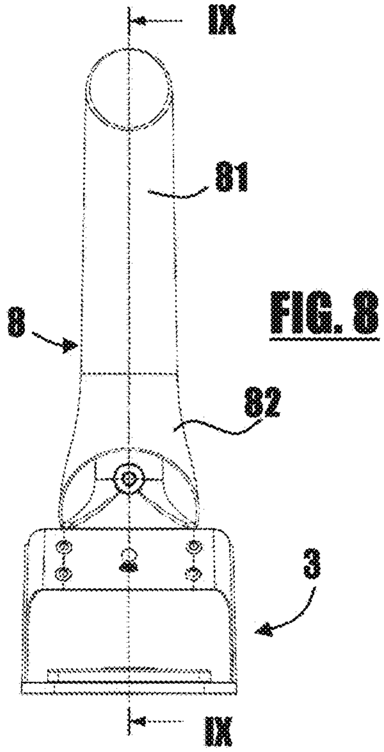
Figure 9:
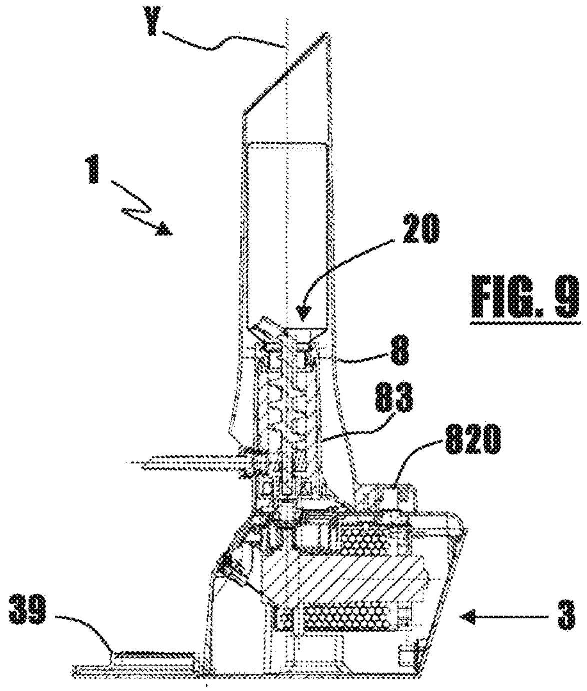
Figure 10:
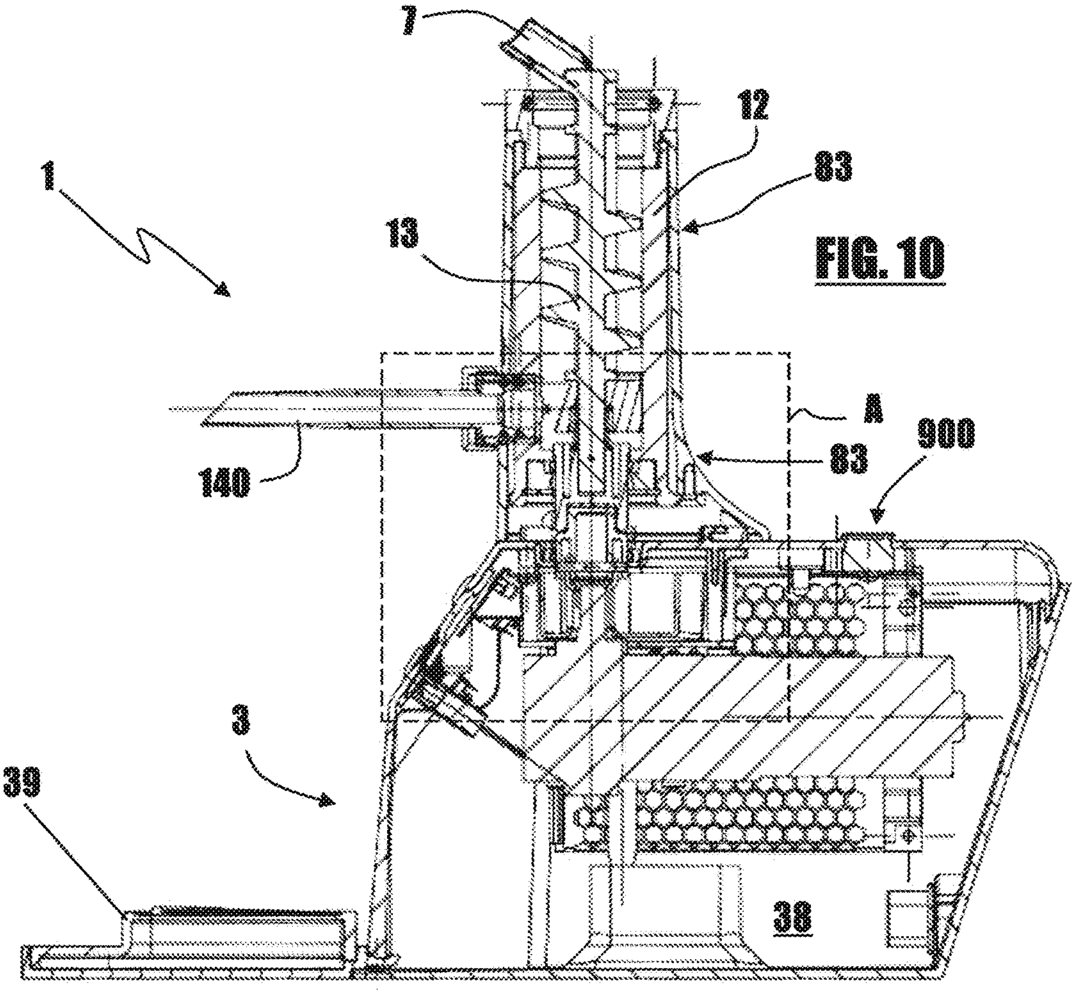
Figure 11:
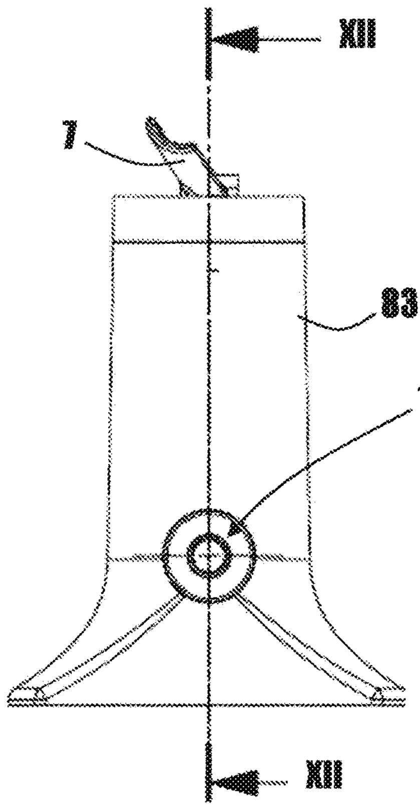
Figure 12:
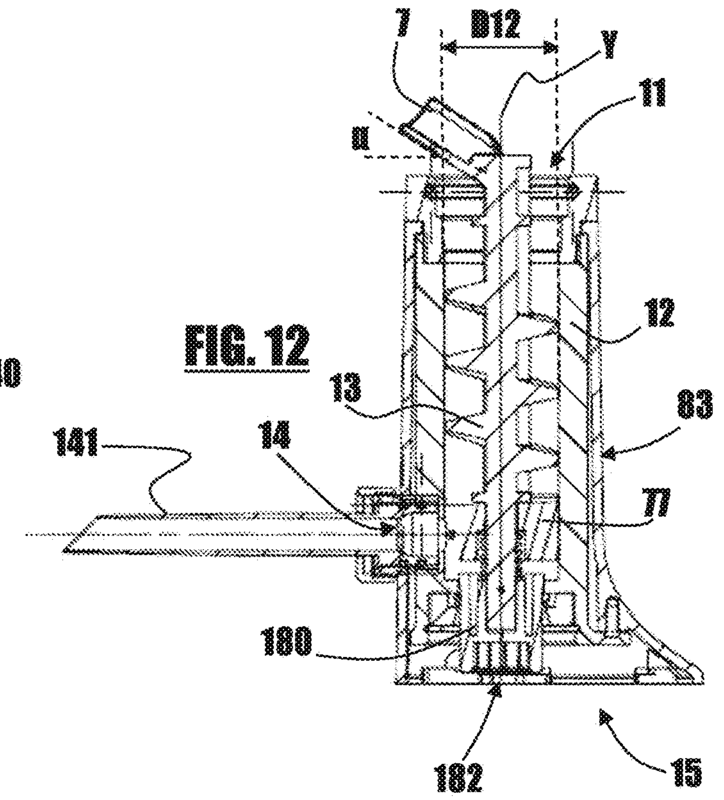
Figure 13:
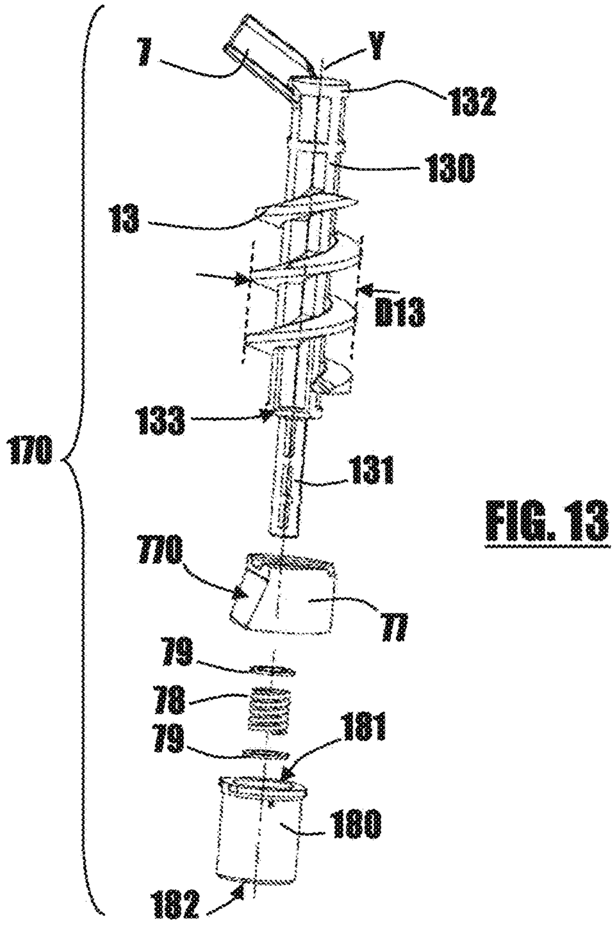
Figure 14:
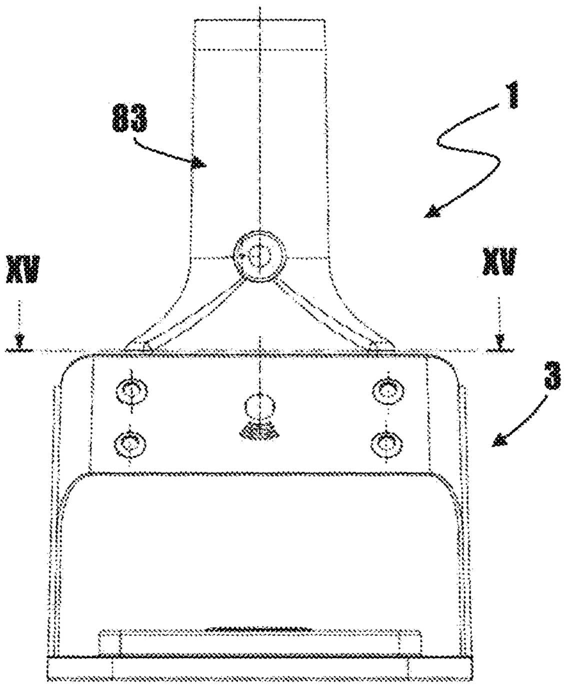
Figure 15:
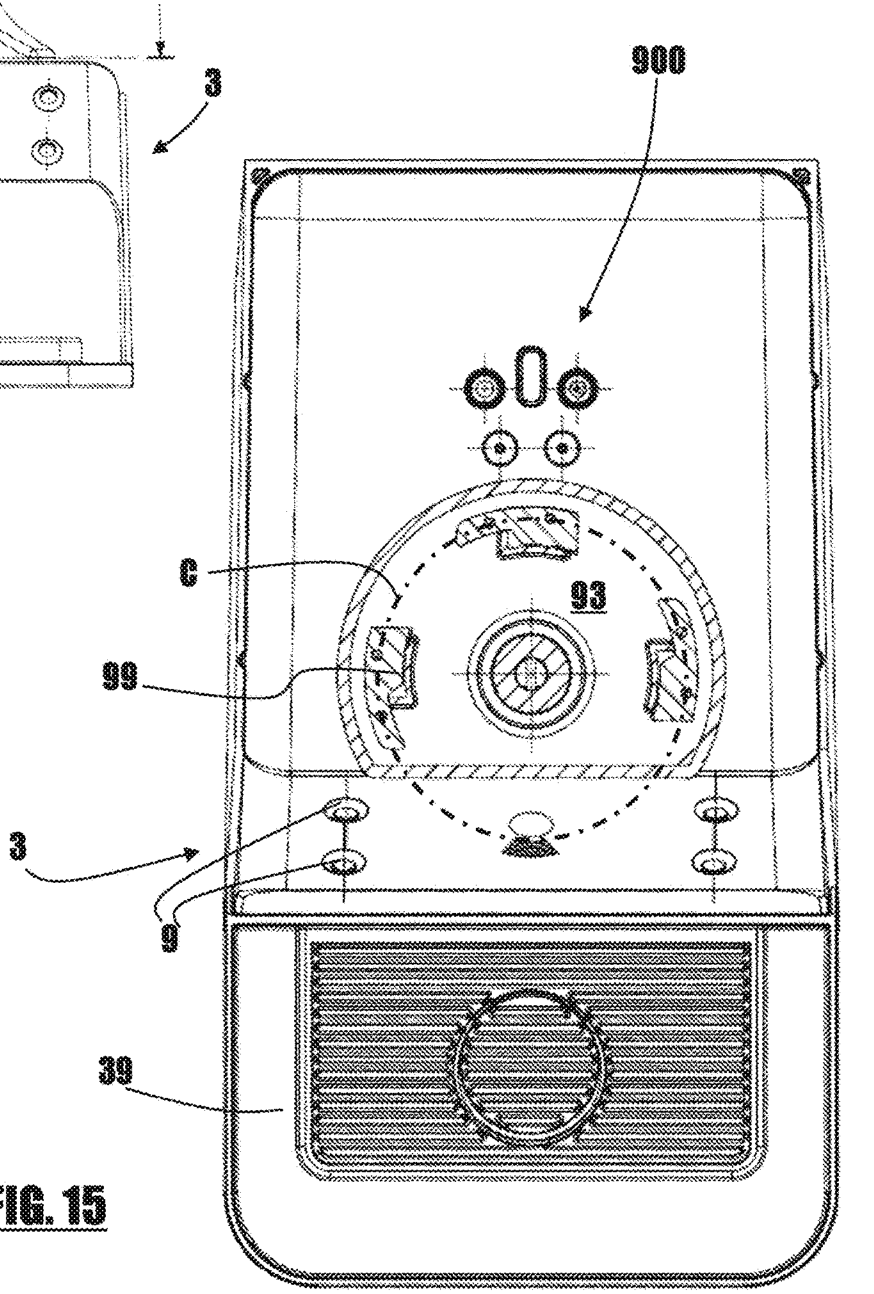
Figure 16:
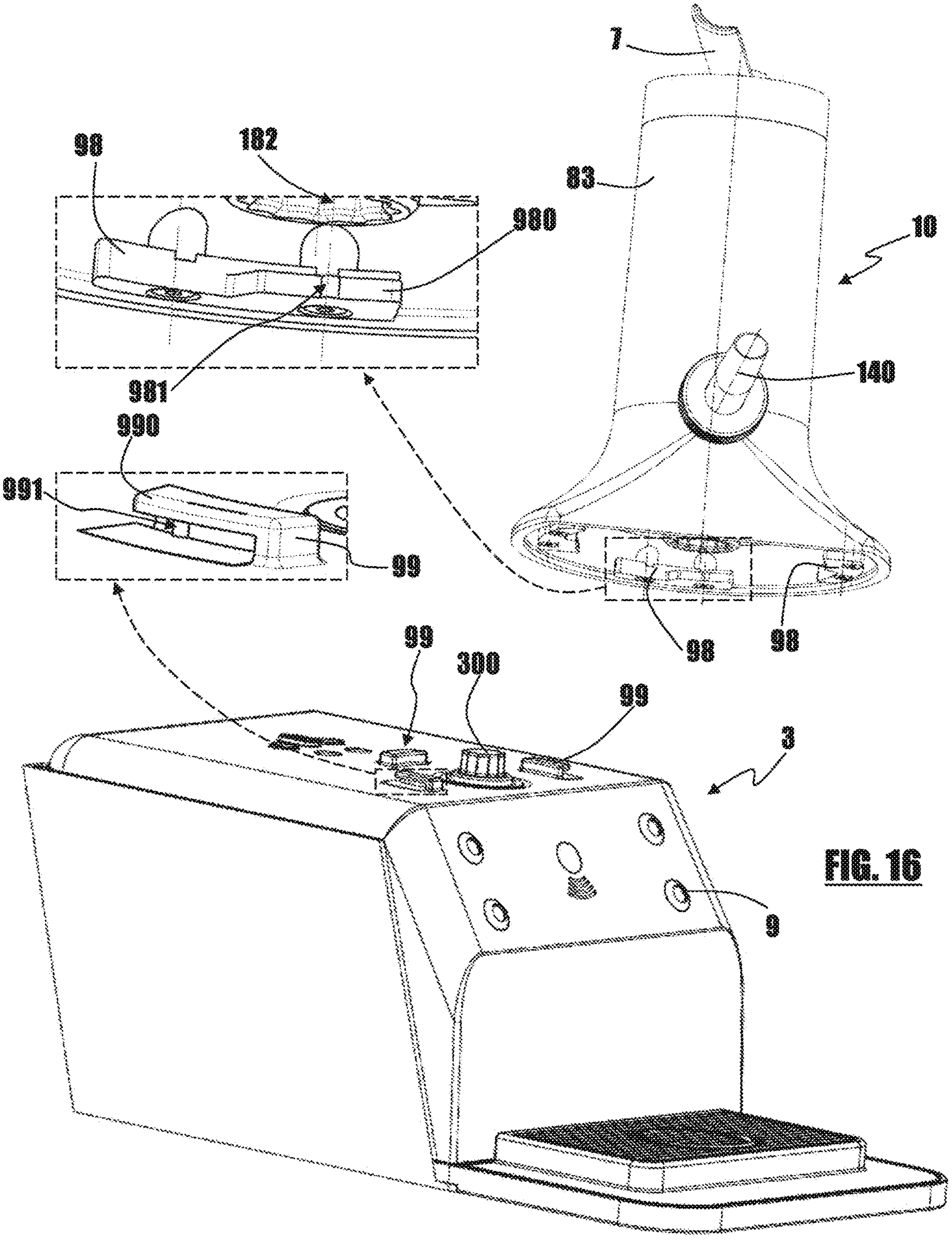
Figure 17:
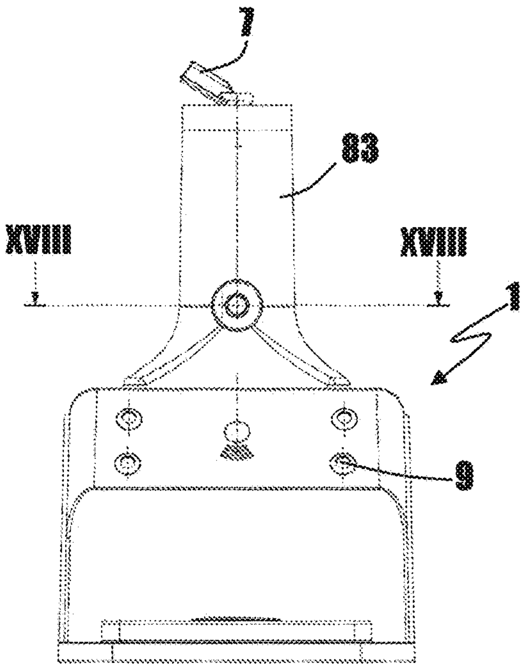
Figure 18:
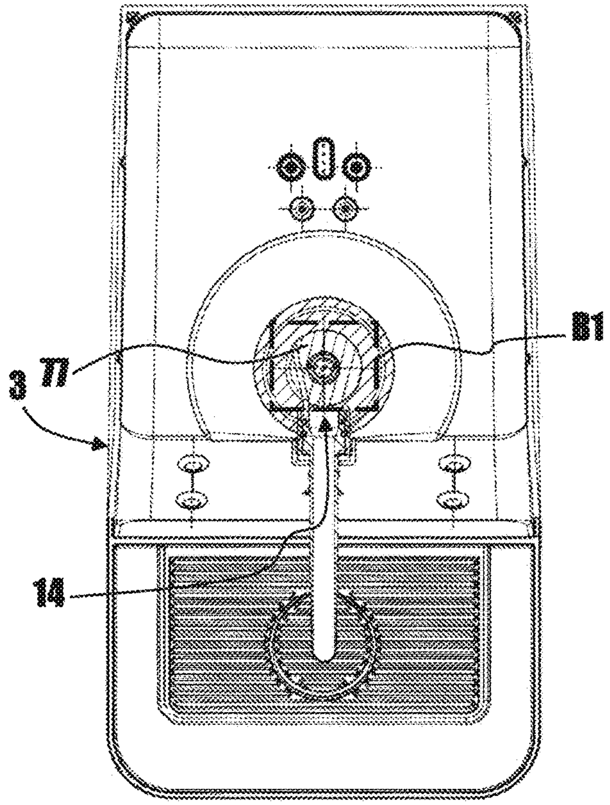
Figure 19:
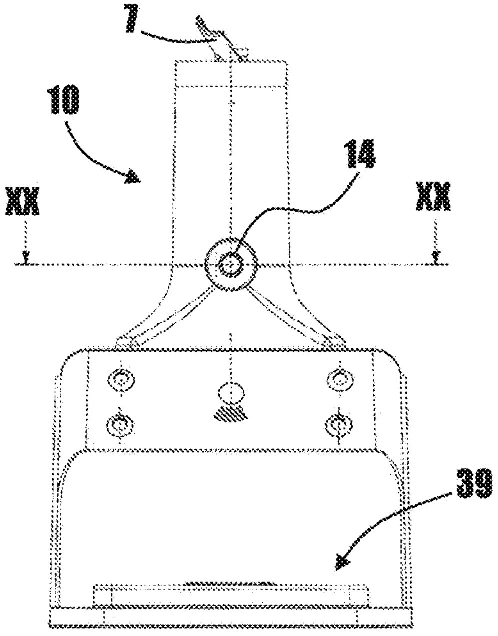
Figure 20:
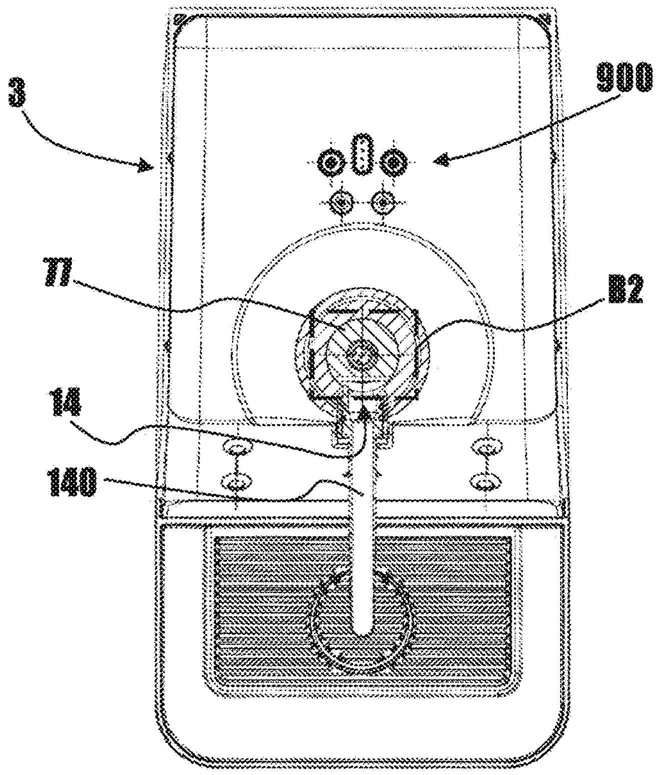
Figure 21:
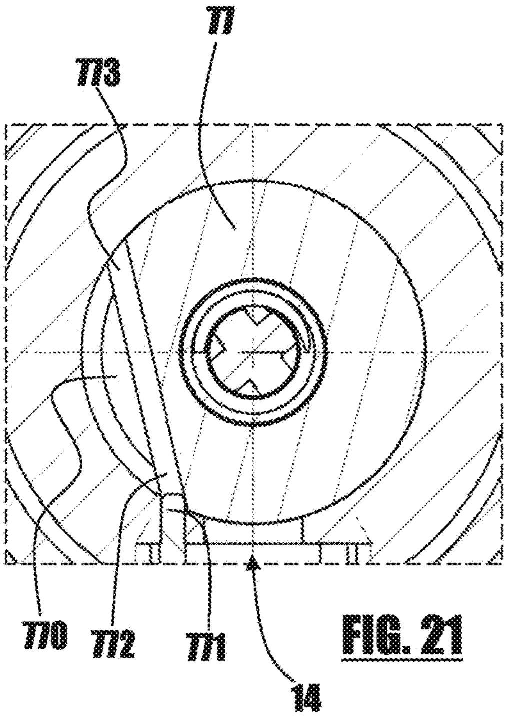
Figure 22:
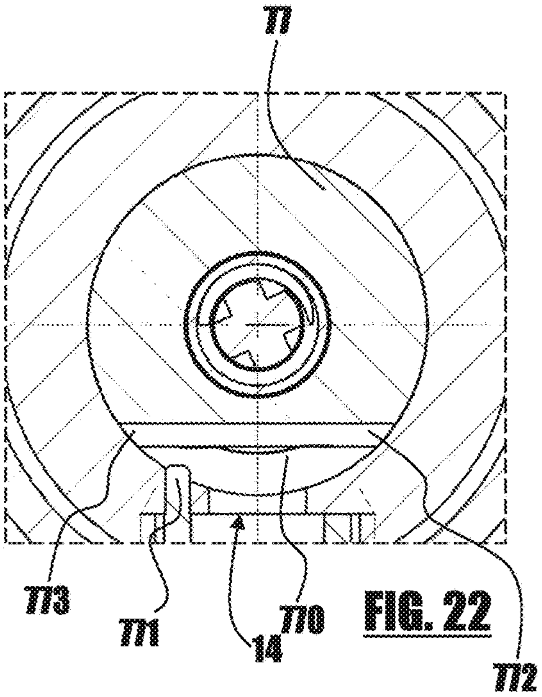
Figure 23:
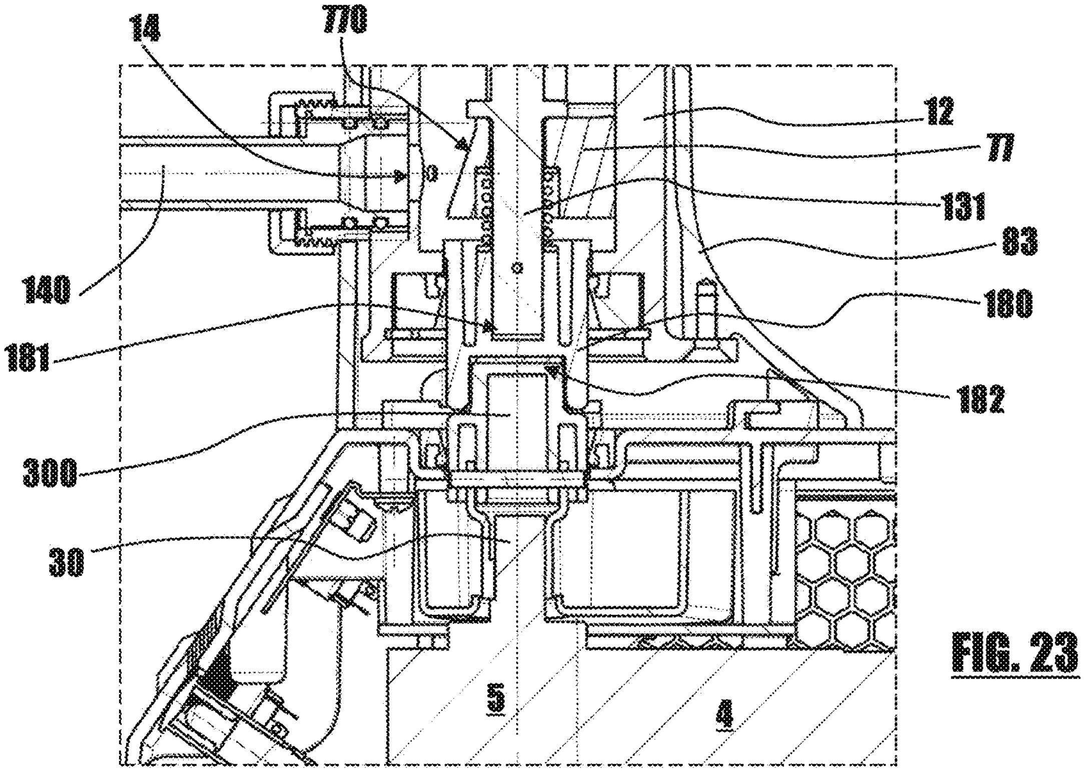

FIGS. 8 and 9 relate to the example of FIG. 7 represented, respectively, in a front view and in a sectional view along the line IX-IX of FIG. 8;

FIG. 10 is the sectional view of FIG. 9 on an enlarged scale and with some details removed;

FIG. 11 is a schematic front view of the upper portion of the example of FIG. 7;

FIG. 12 is a section view along the line XII-XII of FIG. 11;

FIG. 13 is an exploded view of an example of embodiment of the screw element;

FIG. 14 is a front view of the base portion of the embodiment example of FIG. 7;

FIG. 15 is a sectional view along the line XV-XV of FIG. 14;

FIG. 16 is a schematic perspective view, with two enlarged details, of the embodiment of FIG. 7 in which the dispensing device is separated into two parts to better show the releasable association means acting between the two parts;

FIGS. 17 and 18 relate to the example of FIG. 7 represented, respectively, in a front view and in a sectional view along the line XVIII-XVIII of FIG. 17 to show a possible embodiment of the dispensing nozzle closing means, shown in a closure configuration in which the substance to be dispensed does not pass through the nozzle;

FIGS. 19 and 20 relate to the example of FIG. 7 represented, respectively, in a front view and in a sectional view along the line XX-XX of FIG. 19 to show a possible embodiment of the dispensing nozzle closing means, shown in an opening configuration in which the substance to be dispensed can pass through the nozzle;

FIGS. 21 and 22 are enlarged views of the details indicated, respectively with B1 in FIG. 18 and with B2 in FIG. 20; and FIG. 23 is an enlarged view of the detail indicated with A in FIG. 10.

With reference to the attached drawings, a dispensing device (1) of food substances made in accordance with the invention can be used for the controlled delivery of a substance in a viscous, gelatinous or creamy form such as, for example, honey, jam, marmalade, compotes, sauces, preserves and creams of various types, such as, for example, hazelnut, pistachio or custard or mixtures, both sweet and salty, both anhydrous and hydrated.

The substance to be dispensed is contained in a relative container (2) which can be associated with the dispensing device (1) in correspondence with a mouth (20) of the container through which the substance to be dispensed passes. In use, the container (2) is positioned with the mouth (20) facing downwards, so that the substance to be dispensed can flow by gravity through the same mouth (20), and the dispensing device (1) is placed under the container (2).

In particular, with reference to the drawings of FIG. 1, the mouth (20) of the container (2) can be received in a corresponding inlet seat (11) provided on a hollow body (12) which houses a screw element (10) which will be described later. The inlet (11) can have a slightly larger diameter than the mouth (20) of the container (2) so as to allow the sealed reception of the same open portion (20) in the inlet (11). In the embodiment illustrated in the drawings, the inlet (11) has one or more steps on which the mouth (20) of the container rests. It is possible to increase the seal between the mouth (20) and inlet (11) by using a gasket such as the O-ring type. The connection between the inlet (11) of the dispensing device (1) and the mouth (20) of the container (2) is therefore stable and reversible since it allows a tight connection and an easier replacement of the container (2).

It is also possible to realize particular conformations of the profile of the inlet (11) so as to make the inlet (11) associable only to containers or bottles (2) which are provided with a complementarily shaped mouth (20). In other words, with the possibility of a "dedicated" connection which allows the dispensing device to be equipped only with a type of container or bottle, the dispenser according to the invention is advantageous in all those types of use, such as those that provide for the loan for use of the dispensing device, or in which the user is to be obliged to use containers or bottles coming only from a specific supplier. The dedicated association between dispenser and container can be achieved in different ways. A first type of connection can provide that the mouth (20) of the container (2) and the inlet (11) can have a thread with a non-standard pitch (for example screwing in an anticlockwise direction instead of clockwise); another typology can be constituted by a particular joint that allows the association of the inlet (11) only with compatible containers (2); a further type of dedicated connection between dispenser and container can be made by inserting in the container (2) a chip or other element recognizable by a corresponding sensor connected to the product dispensing means (for example to the motor-reducer) to provide consent to dispensing only for containers provided with such identification element. The examples described are not limitative of other embodiments which provide an inlet (11) of the device and a corresponding mouth (20) of the container provided with means that allow their complementary univocal coupling.

Figure 1:
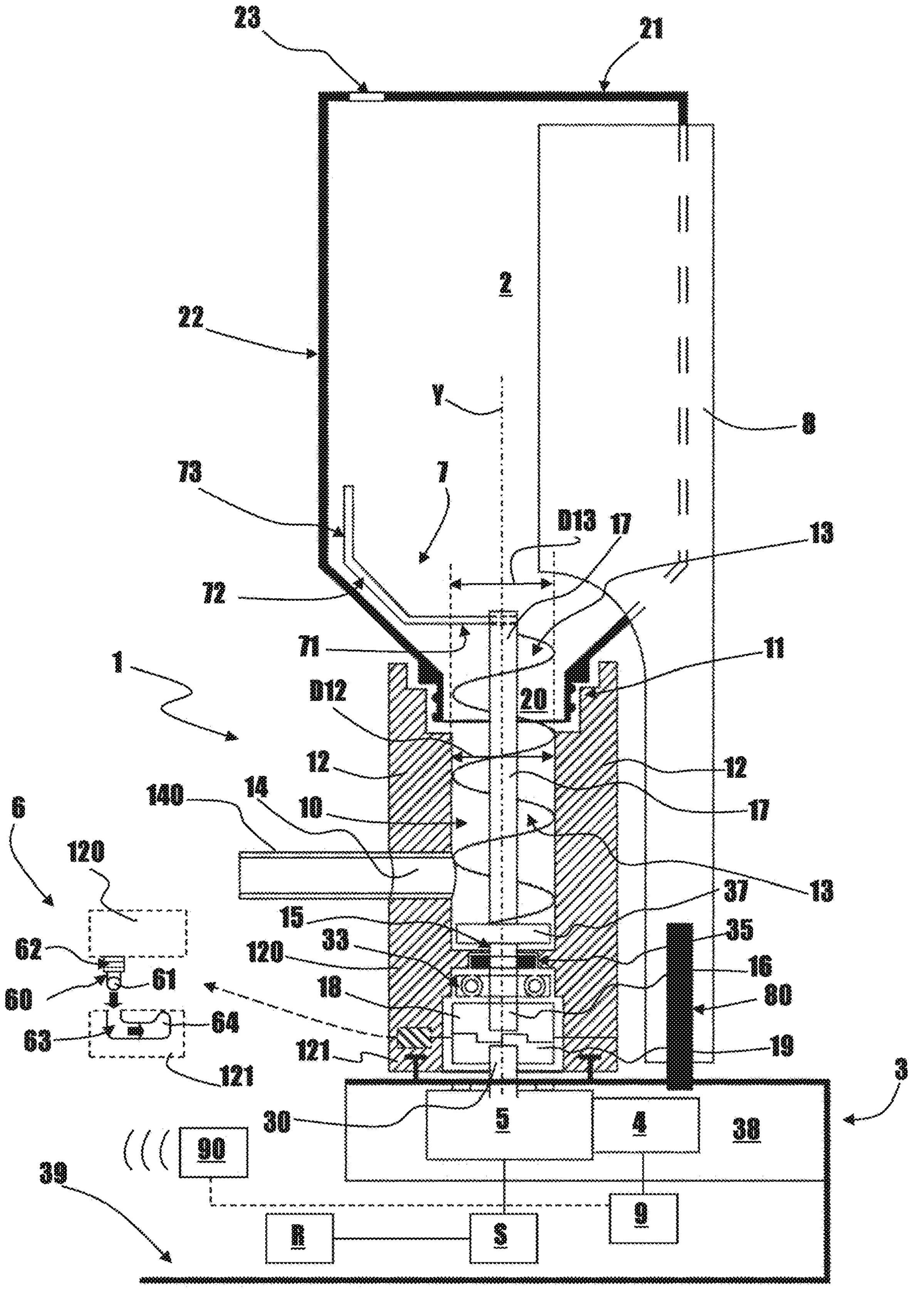
FIG. 1 is a schematic front view of a possible embodiment of the device, of which some parts are partially represented, others are represented by blocks and still others omitted to highlight others, and with a detail represented on an enlarged scale.

The screw element (10) is contained in a hollow cylindrical body (12) with a vertical axis (Y) in the example of FIG. 1, on which are formed the inlet (11) through which the substance to be dispensed flows and a dispensing outlet (14), preferably provided with a spout (140); the helicoid (13) of the screw element (10), which can be of the fixed or modular type, has an external diameter (D13) substantially corresponding to the internal diameter (D12) of the cylindrical body (12). The latter acts as a conveyor tube.

In possible alternative embodiments of the invention, the cylindrical body (12) in which the helicoid is contained can have an oblique or horizontal axis.

The base (3) can have, as in the example of FIG. 1, a "C" shape seen in a vertical section, with a lower support portion (39) and a closed compartment (38) in which to house the means motors described below.

The support base (3) can in fact be configured to house motor means (4, 5) connected and acting on the screw (10) to activate the rotation of the helicoid (13) on command and obtain the consequent controlled transfer of the substance to be dispensed from the container (2) towards said dispensing outlet (14).

In FIGS. 2-5 shows another possible embodiment of the base (3).

Figure 6:
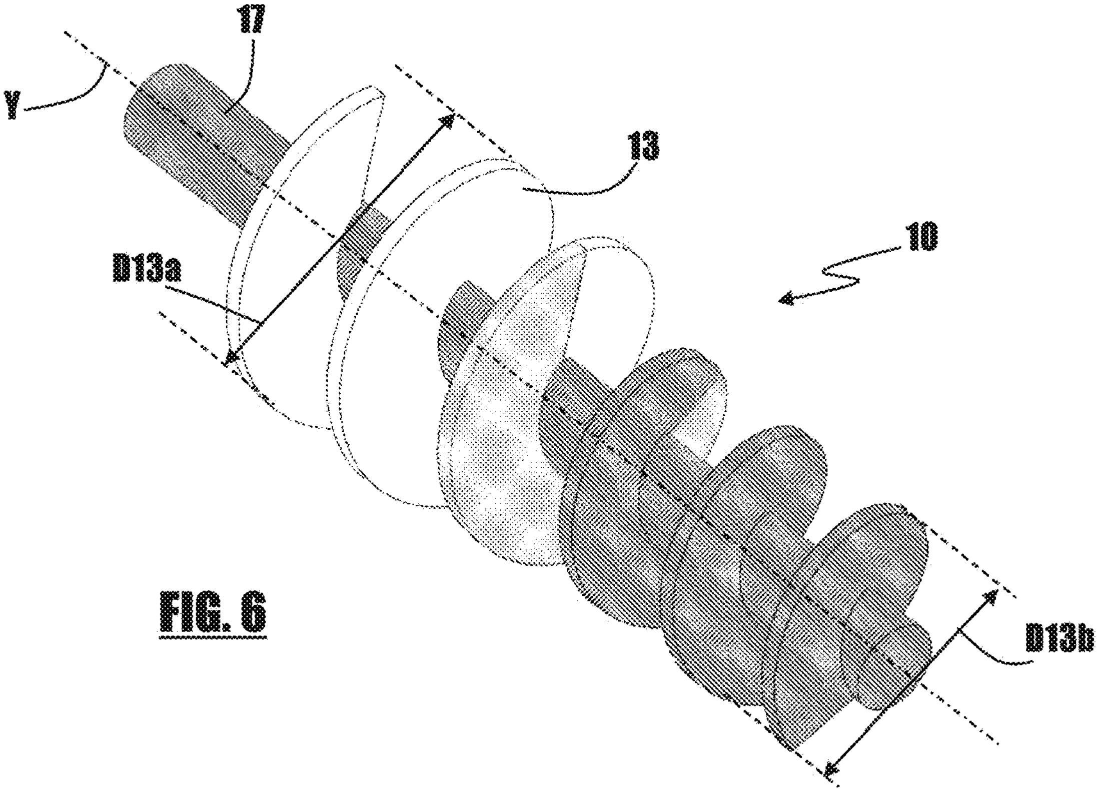
FIG. 6 shows, in a schematic perspective view, a possible embodiment of a variable diameter screw element.

The motor means (4, 5) can comprise an electric motor (4) and a relative speed reducer (5) which move a first vertical shaft (30) connected, in a stable and reversible way, to a second vertical shaft (17) which, in turn, is integral with the helical (13) of the screw element (10). The experiments carried out in the design phase of the present invention have shown that in order to obtain an optimal movement, i.e. thrust, flow rate and therefore delivery of the substance, it is possible to effectively exploit the combination of the force of gravity that pushes the substance downwards, the speed rotation of the helicoid (13) and a suitable configuration and geometry of the screw element (10) which provides for a reduced gap between the external profile of the helicoid (13) and the internal walls of the cylindrical body (12), in order to avoid upward leakage of the substance to be dispensed. For example, the difference between the value of the internal diameter (D12) of the cylindrical body (12) and the value of the external diameter (D13) of the helicoid (13) is preferably less than 10 mm, with variations depending on the type of material to be move and on the conformation of the helicoid (13). Depending on the type of substance, the thrust required and the flow rate to be delivered, it is possible to create helical elements (13) whose diameter is variable along the axis (Y); in particular, with reference to the non-limiting example of FIG. 6, the diameter in the distal portion (D13*b*), intended to be arranged in correspondence with the mouth (20), may be smaller than the diameter of the proximal portion (D13*a*) presented by helicoid in the area located inside the cylindrical body (12).

With reference to the non-limiting example of FIG. 1, the cylindrical body (12) is provided with an opening (15) arranged at the bottom through which the connection end (16) of the drive shaft (17) of the cochlea (10) sealingly passes; the connecting end (16) is provided with a first coupling element (18) complementarily shaped with respect to a second coupling element (19) presented by the drive shaft (30) connected to the motor means (4, 5) to allow a stable and reversible connection between the two shafts (17, 30).

On the driven shaft (17) there is a ball bearing (33) surmounted by a sealing gasket (35); a disk element (37) can also be placed above the lower opening (15) of the body (12) to better isolate the overlying part of the cylindrical body (12) from the area affected by the bearing (33). The presence of the bearing (33) determines the correct vertical positioning of the shaft (17) and of the helicoid (13) inside the cylindrical body (12). A greater number of ball bearings can be provided, as well as roller bearings and/or annular bodies made of a material with a low coefficient of friction such as, for example, Teflon or other. The sealing gaskets can be formed by oil seal discs or similar elements.

The screw element (10) can be connected to said base (3) by means of a bayonet coupling (6), illustrated by means of a schematic representation in the detail on the left of FIG. 1. In the example of embodiment of this detail, which is not limiting to other solutions, the lower portion of the cylindrical body (12), identified by the reference (120), can be reversibly associated by "bayonet" to the corresponding portion (121) which it is made integral with the base (3). In particular, the portion (120) is provided with an appendix (60) which has a pin (61) which can be inserted in a corresponding shaped seat (63) presented by the portion (121). The displacement of the pin (61) to be inserted in the shaped seat (63) is represented by the arrows; in practice, after positioning the cylindrical body (12) (together with the container 2 possibly fixed to it) on the base (3), the pin (61) moves vertically downwards to be then rotated and locked in the end part (64) of the seat (63); the end part that extends upwards so as to keep in position the pin (61) which is pushed upwards by the reaction of a spring (62) fitted on the appendix (60) which supports the pin (61). Obviously, the connection with bayonet coupling can also be made in other ways, just as the bayonet coupling can be replaced by any convenient connection that allows stable and reversible coupling between the dispensing device (1) and the base (3).

Figure 5:
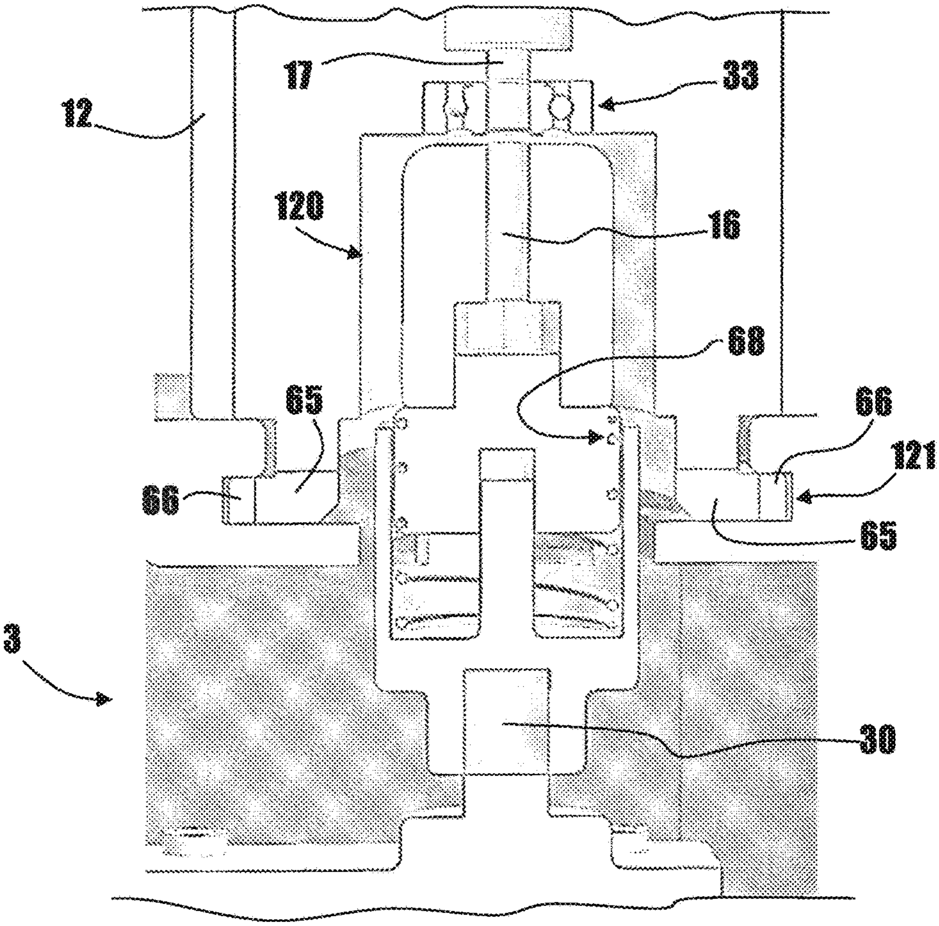

Another possible non-limiting example of realization of the connection means (6) between the screw element (10) and the base (3) is shown in FIGS. 3-5, in which the components of the device have a numbering corresponding to those of FIG. 1. In this embodiment, the lower portion of the cylindrical body (12), identified by the reference (120), can be reversibly "bayonet" associated to the corresponding portion (121) which is made integral with the base (3). In particular, the portion (120) is provided with a lower cylindrical extension (67) from which protrude two appendages (65) formed by circular portions, arranged diametrically opposite each other. The portion (121), which is fixed to the base (3), is provided with a shaped seat (66) in which the two appendages (65) can enter with a vertical displacement to be constrained following a rotation that makes them engage appendages (65) in corresponding receiving recesses, pushed by a spring (68), visible in FIG. 5. Also with this solution a safe and easy coupling is allowed between the shaft (16) presented by the screw element (10) and the shaft (30) connected to the reducer (5).

Therefore, thanks to the particular connection between the base (3) and the screw element (10) (and therefore the entire dispensing body of the device 1) it is possible to easily separate the two components to perform cleaning operations effectively and in reduced time.

Another advantage deriving from the possibility of easily disassociating the body of the dispenser (1) from the support base (3) relates to the simplicity of the operations for replacing the containers (2).

In fact, with the screw element (10) detached from the base (3) it is possible to fix the inlet (11) of the screw element (10) to the mouth (20) of the container (2) when the latter is with the mouth (20) placed at the top. This substantially eliminates the possibility of unwanted leakage of the substance from the container (2) during association with the screw element (10), contrary to what happens in known dispensing devices which require loading with the mouth (20) placed at the bottom. In practice, when a container must be fixed to the dispensing device, the container (2) is placed with its base (21) resting on a surface and the mouth (20) facing upwards to receive the part of the device (1) which presents the inlet (11). Subsequently, the device (1) is fixed to the base (3) and the vent hole (23) provided on the base (21) of the container is opened; the base faces upwards after fixing.

Advantageously, moreover, the helical (13) of said screw element (10) extends upwards beyond said inlet (11) so as to penetrate inside said container (2).

In particular, with reference to the illustrated example, at the upper end of the shaft (17) of the screw element (10) there is fixed a crusher arm (7) shaped according to a broken line that projects upwards following the profile of the walls (22) of the container (2). In particular, the arm (7) has a proximal portion (71) fixed to the shaft (17) which develops radially (horizontally with reference to the drawing), a median portion (72) oblique and a distal portion (73) which develops substantially parallel to the (Y) axis, vertically in the drawing reference.

The action of the crushing arm (7) (which is integral with the screw element in its rotation) is extremely advantageous to allow the correct (complete) emptying of the container (2), in particular in those cases in which the viscosity or the density of the product to be dispensed determine the formation of agglomerates which adhere to the internal walls of the container (2) or which in any case tend not to come out of the container itself. Experimental tests have shown that the use of the arm (7) determines the complete emptying of the container (2) with all the products used. In other words, the intervention of the arm (7) increases the effectiveness of the screw conveyor (10) which already without the arm is much more efficient than known dispensers.

Correct (complete) emptying of the container (2) can be facilitated by heating means which can operate in addition or as an alternative to the arm (7) described above. In the example illustrated, the heating means are represented by a jacket (8) which extends so as to at least partially cover the walls of the container (2), as can also be seen in the example of FIG. 2. The jacket (8) can also be close to the dispensing body (1), in order to maintain the correct temperature and therefore fluidity to the substance held inside the dispensing body.

The jacket (8) can house heating elements (for example resistances) and is supported by a support body (80) which connects it to the base (3), both to support it and to supply electrical power to the heating elements. A temperature sensor may be provided on the jacket (8) to provide a signal for a relative thermostat. On the base (3) there will be an activation button and possibly a temperature regulator when necessary.

The heating will be used for those products that at relatively low temperatures do not have sufficient fluidity to allow dispensing.

The heating means can also be constituted by other heating elements such as, for example, the same screw element (10) shaped so as to transmit the heat to the product to be dispensed, or by lamps that heat the container, etc.

As previously said, the motor means (4, 5) can comprise an electric motor (4) and a reducer (5) to obtain the reduction of revolutions considered most appropriate. The activation of the motor means (4, 5) can be obtained by means of a switch or button (9). In this way the screw element (10) can be activated for periods of variable duration so as to dose the quantity dispensed as desired.

Advantageously, the switch or button (9) can be activated without manual contact, for example with a proximity sensor (90). In this way, all physical contacts of the users with the device are eliminated, increasing safety in relation to the possibility of contamination due to manual contact.

The dispensing device (1) can also comprise a sensor (S) acting on the motor means (4, 5) and/or on the screw element (10) capable of detecting, for example, the number of revolutions of the screw element (10) to provide a value of the volume of the substance delivered by the device (1). In other words, on the device (1) a sensor (S) capable of supplying data suitable for producing statistics or simply for measuring the quantity of substances dispensed is arranged and acting.

The sensor (S) can also be connected, via cable or wireless, to a telecommunication network (R) (for example the Internet) to transmit data remotely.

The connection of the sensor (S) to the motor (4) and/or to the reducer (5) and/or to the screw element (10) can also detect any anomalies in the functioning of the device (1) to signal, for example, an excessive or too low resistance offered by the screw element (10) due to excessive hardening or dissolution of the substance to be dispensed or mechanical problems (friction above a threshold value, etc.). In practice, it is possible to remotely monitor the dispensing device (1) without being forced to a local control.

In accordance with the illustrated example, the dispensing outlet (14) is formed above the base (3) which, therefore, is not affected by the flow of the dispensed substance.

Similarly to what is illustrated, the dispensing outlet (14) consists of a lateral appendage of the hollow body (12) and can be provided with a nozzle-shaped spout (140).

Preferably, moreover, said delivery outlet (14) is arranged at a predetermined distance from the lower side of the hollow body (12), as shown in the drawing, or above the aforementioned bearing (33) which, therefore, is also below the dispensing outlet (14) and never affected by contact with the food product to be dispensed.

Reference will now be made to the example illustrated in the drawings of FIGS. 7-23, in which the same numerical references have been used to indicate corresponding parts.

Also in the use of this embodiment of the invention, the mouth or open portion (20) of the container (2) is connected to a corresponding inlet seat (11) provided on the hollow body (12) which houses the screw element (10). The inlet (11) is shaped and dimensioned to allow the airtight reception of the same open portion (20) in the inlet (11). In the embodiment illustrated in the drawings, an O-ring type gasket (110) is provided. The connection between the inlet (11) of the dispensing device (1) and the mouth (20) of the container (2) is therefore stable and reversible since it allows a tight connection and an easier replacement of the container (2).

As in the example described above, the dispensing device (1) shown in FIGS. 7-23 comprises a screw element (10) and a support base (3).

The screw element (10) is composed of a hollow cylindrical body (12) whose main axis is placed vertically (Y) when the device is in use conditions and which contains the helicoidal or helical element (13) which pushes the substance to be dispensed; the body (12) has the inlet (11) to which connect the container (2) and a dispensing outlet (14) provided with a spout (140); at the bottom, as in the previous example, the body (12) has an opening (15) through which the connection that transmits the motion from the motor unit (4, 5) of the base (3) to the helical element (13) of the screw (10) passes.

In this embodiment, the jacket (8) that covers the upper part of the dispensing device (1) has a substantially cylindrical tubular conformation, with an upper portion (81) truncated obliquely at the upper end and a lower portion (82) which widens downwards to partially cover the rear part of the upper surface of the base (3). The cylindrical body (12) is covered by a coating (83) which adheres to the surface of the body (12). The jacket (8) is fixed to the base (3) together with the body (12) in a stable but reversible way and is preferably made in a single body. Furthermore, a rear portion (820) of the lower portion (82) of the jacket is shaped so as to engage one or more microswitches (900) provided on the base (3) and connected to the motor means (4, 5) of the device (1) to deactivate the latter in correspondence with the detachment of the jacket (8) from the base (3). This feature determines an increase in operational safety.

The helicoid or helical element (13) of the screw element (10), which can be of the fixed or modular type, can have, as indicated for the previous example, an external diameter (D13) substantially corresponding to the internal diameter (D12) of the cylindrical body (12) which acts as a conveyor tube.

With reference to the example of FIGS. 7-23, the helical element (13) of the screw element (10) extends along the longitudinal development of a shaft (130) provided with a lower coupling portion (131), intended for connection with the motion transmission components, and an upper portion (132) which extends into the arm (7) which, as in the previous example, has the function of facilitating the escape of the food substance contained in the container (2), possibly carrying out a crushing and/or a scraping of the same substance. In particular, the scraper/crusher arm shown in the example of FIGS. 7-23, is inclined by an angle (a) of about 30° with respect to the axis (Y) of the shaft (130) and has an arched conformation, i.e. a section that substantially traces an arc of circumference. This type of arm proved to be particularly advantageous in the experiments carried out. The angle (a) of the arm (7) with respect to the shaft (130) can vary according to the conformation of the internal walls of the container (2) and/or the substance to be dispensed.

The lower portion (131) of the shaft (130) is fixed (for example by means of an elastically fixable pin, not shown in the drawings) to a coupling bush (180), which has an upper seat (181) to accommodate said coupling or lower portion (131) and a lower seat (182) in which a connecting shaft (300) connected to the motor shaft (30) of the gearmotor (4, 5) is received, which, as in the previous example, is housed in a closed compartment (38). In other words, the motor means (4, 5) can comprise an electric motor (4) and a relative speed reducer (5) which move a first vertical shaft (30) connected, in a stable and reversible way, to a second vertical shaft (300) which in turn is integral with the helical element (13) of the screw element (10) because it is engaged in the lower seat (182) of the coupling bushing (180).

An obturator element (77) is fitted onto the lower portion (131) of the shaft (130), which is arranged above the coupling bush (180); on the same lower portion (131), below the shutter (77), a spring (78) is fitted which is separated from the shutter element (77) and from the bush (180) by means of corresponding washers (79). The shutter element (77) is in contact with a circular protruding edge (133) which delimits the area of the shaft (130) on which the helicoid (13) develops.

Advantageously, all the components illustrated in FIG. 13, i.e. the shaft (131) which supports the crusher/scraper arm (7) at the top and on which the helical element (13) is formed, together with the shutter element (77) and to the coupling bushing (180), constitute a single element which can be detached from the rest of the device in a single operation. In other words, during the assembly or disassembly of the device (1) the set of elements identified with the numerical reference (170) in FIG. 13 is a single block that allows to facilitate and accelerate the assembly and disassembly operations.

The shutter element (77) has a substantially straight cylindrical conformation with a beveled portion (770) which is defined by an inclined plane and which allows the food substance to be dispensed when said beveled portion (770) is arranged in correspondence with the mouth of outlet (14) of the screw element (10). In FIGS. 17-20 two operating positions of the device are shown (1). In particular, in FIGS. 17 and 18 it can be seen that the shutter (77) is placed in a configuration in which its beveled portion (770) does not coincide with the outlet opening (14) and therefore the straight cylindrical walls of the shutter (77) obstruct the opening (14); on the contrary, in FIGS. 19 and 20 it can be seen that the shutter (77) is placed in a configuration in which its beveled portion (770) coincides with the outlet opening (14) and therefore the opening (14) is free, thus allowing the leakage of the substance through the spout (140). The locking of the beveled portion (770) in a given configuration can be advantageously carried out by means of a pin (771) which is arranged on one side of the outlet mouth (14). The pin (771) can be fixed to the cylindrical body (12) or to a portion which supports the outlet mouth itself (14) and possibly the nozzle (140). With reference to the orientation of the drawings of FIGS. 17-22, when the shutter (77) is rotated clockwise, a first end part (772) of its beveled portion (770) placed "upstream" with respect to the direction of rotation (i.e. the one on the right in the figures) comes into contact with the pin (771) causing the shutter (77) to lock in the configuration (shown in FIGS. 17, 18 and 21) in which with the cylindrical walls straight lines closes the outlet opening (14). On the contrary, when the shutter (77) is rotated anti-clockwise, the pin (771) engages the second end part (773) of its beveled portion (770) which is placed "upstream" with respect to the direction of anti-clockwise rotation (i.e. the one on the left in the figures) determining the positioning of the shutter (77) in the configuration (shown in FIGS. 19, 20 and 22) in which the outlet opening (14) is free because the beveled portion (77) does not interfere with it. Obviously, means for connection to the motor means will be provided so as to release (for example by friction) the shutter (77) from rotation when the closing or opening configuration is reached. Advantageously, the beveled portion (770) of the shutter (77) allows an easy passage of the material to be dispensed even in the presence of non-uniformity in the product thanks to the large opening it determines at the outlet opening (14).

Like the device shown in FIGS. 1-6, also that of FIGS. 7-23 allows you to separate the screw element (10) and the base (3) in a simple and fast way to perform cleaning operations effectively. For this purpose, a bayonet quick coupling is provided which, in the example, provides a first plurality of coupling brackets (99) (three in the example) fixed on the base (3) and arranged along a circumference. On the screw element (10) there is provided a corresponding second plurality of coupling brackets (98) also arranged along a circumference and spaced apart so as to match the brackets (99) of the base (3). In FIG. 15 the ideal circumference along which the brackets (99) are arranged is indicated by the dash-dot line (C). Each bracket (99) of the base (3) is provided with a wing (990) which extends outwards parallel to the upper plane (93) of the base (3) so as to form a sort of seat open on one side in the direction of development of the circumference (C). Correspondingly, each bracket (98) of the screw element (10) is provided with a wing (980) which extends inwards so as to form an appendage which extends on one side along the direction of development of the circumference (C). Thanks to the conformation of the coupling brackets (99, 98) it is possible to associate and separate the screw element (10) and the base (3) thanks to the simple overlapping of the screw element (10) on the base and the subsequent rotation in the direction which determines the insertion of the appendages defined by the wings (980) in the seats defined by the wings (990) of the base (3). For a better coupling of the brackets, teeth or projections (991, 981) can be provided in correspondence with the portions of the brackets (99, 98) intended to come into mutual contact.

Also in the device illustrated in FIGS. 7-23, the jacket (8) can house heating elements (for example resistances) and/or refrigerants (for example Peltier cells).

As previously said, the motor means (4, 5) can comprise an electric motor (4) and a reducer (5) to obtain the reduction of revolutions considered most appropriate. The activation of the motor means (4, 5) can be obtained by means of a switch or buttons (9) provided on the front part of the base (3). In this way the screw element (10) can be activated for periods of variable duration so as to dose the quantity dispensed as desired.

Similarly to what is provided for the example of FIGS. 1-6, the switch or button (9) can be activated without manual contact, for example with a proximity sensor (90). In this way, all physical contacts of the users with the device are eliminated, increasing safety in relation to the possibility of contamination due to manual contact.

Also the other characteristics described for the example of FIGS. 1-6 can be present in the example shown in FIGS. 7-23.

Advantageously, moreover, the upper part of the base (3) can be provided with microswitches (900) which allow the activation of the dispensing device (1) only when the latter is correctly mounted, that is to say when the microswitches (900) they are engaged by a corresponding rear portion (820) of the lower part (82) of the jacket (8).

In practice, the details of execution can in any case vary in an equivalent manner as regards the individual elements described and illustrated, without thereby departing from the idea of the solution adopted and thus remaining within the limits of the protection granted by this patent in accordance with the following claims.

The invention claimed is:

1. Dispensing device of food substances in viscous, gelatinous or creamy form, usable for the controlled dispensing of a substance contained in a relative container (2) which can be associated with the dispensing device (1) in correspondence of a mouth (20) of the container through which the substance to be dispensed passes, dispensing device (1) comprising:

- a screw element (10) comprising a hollow cylindrical body (12) with an inlet (11) connectable to the container (2) and a dispensing outlet (14);
- a helicoid or helical element (13) arranged inside and coaxial with respect to said cylindrical body (12);
- a support base (3) comprising motor means (4, 5) connected and acting on the screw (10) to activate on command the controlled rotation of the helicoid (13) and obtain the consequent controlled transfer of the substance to be dispensed from the container (2) towards said dispensing outlet (14);
- dispensing device (1) characterized in that said screw element (10) can be connected to said base (3) by means of a quick release connection, characterized in that the helical element (13) of the screw element (10) extends along the longitudinal extension of a shaft (130) provided with a lower coupling portion (131), intended for the connection with said motor means (4, 5) and that said lower portion (131) of the shaft (130) is fixed to a coupling bushing (180), which has an upper seat (181) to accommodate lower coupling portion (131) and a lower seat (182) in which a connecting shaft (300) connected to the motor shaft (30) of the said motor means (4, 5) is received.

2. Dispensing device according to claim 1, characterized in that said quick release connection is of the bayonet type (6; 99, 98).

3. Dispensing device according to claim 2, characterized in that said bayonet connection (99, 98) comprises a first plurality of coupling brackets (99) fixed on the base (3) and arranged along a circumference and a corresponding second plurality of coupling brackets (98) fixed to the screw element (10) and also arranged along a circumference and spaced so as to meet the brackets (99) of the base (3) when the screw element (10) is superimposed at the base (3).

4. Dispensing device according to claim 3, characterized in that each bracket (99) of the base (3) is provided with a wing (990) which extends outwards so as to form an open seat and that each bracket (98) of the screw element (10) is provided with a wing (980) which extends inwards so as to form an appendix which can be inserted in a corresponding seat defined by a wing (990) fixed to the base (3).

5. Dispensing device according to claim 1, characterized in that the difference between the internal diameter (D12) of the cylindrical body (12) and the external diameter (D13) of the helicoid (13) of the screw element (10) has a value less than 10 mm.

6. Dispensing device according to claim 1, characterized in that said cylindrical body (12) is provided with an opening (15), arranged at the bottom, through which the connecting end (16) of a drive shaft (17) of the screw (10) tightly passes (17), said connecting end (16) being provided with a first coupling element (18) complementarily shaped with respect to a second coupling element (19) presented by a drive shaft (30) connected to said motor means (4, 5) to allow a stable and reversible connection between the two shafts (17, 30).

7. Dispensing device according to claim 1, characterized in that a shutter element (77) is fitted on the lower portion (131) of the shaft (130), arranged above the coupling bush (180), and that said shutter element (77) has a substantially straight cylindrical conformation with a beveled portion (770) which is defined by an inclined plane so as to allow the dispensing of the food substance when said beveled portion (770) is arranged in correspondence with the outlet (14) of the screw element (10).

8. Dispensing device according to claim 7, characterized in that said helical element (13), said shaft (130), said coupling bush (180) and said shutter element (77) are assembled to form a single body, so as to be associated or disassociated simultaneously from the rest of the device (1).

9. Dispensing device according to claim 8, characterized in that it comprises a pin (771) arranged on one side of the outlet mouth (14) and interfering with said beveled portion (770) according to two different modes depending on the direction of rotation of said shutter (77).

10. Dispensing device according to claim 1, characterized in that the helicoid (13) of said screw element (10) extends upwards beyond said inlet (11) so as to penetrate inside said container (2).

11. Dispensing device according to claim 1, characterized in that the helicoid (13) of said screw element (10) extends upwards beyond said inlet (11) with a crusher/scraper arm (7), connected to the screw element (10) and integral with it in the rotation movement.

12. Dispensing device according to claim 1, characterized in that the helicoid (13) of said screw element (10) has a variable diameter, with a greater value (D13*a*) in correspondence with a proximal portion thereof and a value smaller (D13*b*) in correspondence with a distal portion which extends upwards beyond said inlet (11) and is intended to pass through said mouth (20) of the container (2) in the configuration of use.

13. Dispensing device according to claim 1, characterized in that said motor means (4, 5) comprise an electric motor (4) and a reducer (5) and a switch or button (9) adapted to activate the screw (10) for periods of variable duration.

14. Dispensing device according to claim 13, characterized in that said switch or button (9) can be activated without manual contact.

15. Dispensing device according to claim 1, characterized in that it comprises a sensor(S) acting on said motor means (4, 5) and/or on said screw element (10) to provide a value of the volume of the dispensed substance from device (1).

16. Dispensing device according to claim 15, characterized in that said sensor(S) is connected to a telecommunication network (R) to transmit data at a distance.

17. Dispensing device according to claim 1, characterized in that it comprises means for heating (8) and/or for cooling the substance contained in said container (2) and/or in the body of the dispensing device (1).

18. Dispensing device according to claim 1, characterized in that said means for heating (8) and/or for cooling the substance contained in said container (2) and/or in the body of the dispensing device (1) comprise a jacket which covers said cylindrical body (12).

19. Dispensing device according to claim 1, characterized in that reversible connection means (6) are provided to allow coupling and uncoupling between the body of the dispensing device (1) and the base (3) so as to allow the association between the dispensing device (1) and the container (2) with the dispensing device (1) having its inlet (11) facing upwards, wherein said inlet (11) of the device and said mouth (20) of the container are shaped and/or provided with dedicated association means that allow their complementary univocal coupling, in order to allow connection to the device only by a single type of container (2).

* * * * *